(12) United States Patent
Kim et al.

(10) Patent No.: US 9,356,455 B2
(45) Date of Patent: May 31, 2016

(54) DISH HAVING DISPLAY DEVICE AND APPARATUS FOR CHARGING THE SAME

(75) Inventors: Sang-Min Kim, Yongin (KR); Jae-Woon Jung, Busan (KR); Na-Dan Kim, Busan (KR); Tae-Go Shin, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 747 days.

(21) Appl. No.: 13/551,560

(22) Filed: Jul. 17, 2012

(65) Prior Publication Data

US 2013/0249471 A1 Sep. 26, 2013

(30) Foreign Application Priority Data

Mar. 23, 2012 (KR) .................... 20-2012-0002350 U (51) Int. Cl.
*H02J 7/00* (2006.01)
*A47G 19/08* (2006.01)
*A47G 19/02* (2006.01)

(52) U.S. Cl.
CPC ............. *H02J 7/0044* (2013.01); *A47G 19/025* (2013.01); *A47G 19/08* (2013.01)

(58) Field of Classification Search
CPC .......... G09G 5/00; H01L 29/24; A47G 19/08; A47G 19/025
USPC ......................................... 320/107; 211/41.1
See application file for complete search history.

(56) References Cited

U.S. PATENT DOCUMENTS

| | | | |
|---|---|---|---|
| D188,399 S | 7/1960 | Link | |
| D227,137 S | 6/1973 | Dolby et al. | |
| 4,203,486 A * | 5/1980 | Rubbright et al. | 165/48.1 |
| D256,195 S | 8/1980 | Scalice | |
| D259,685 S | 6/1981 | Scalice | |
| 5,022,554 A | 6/1991 | Heeter et al. | |
| D319,361 S | 8/1991 | Moser | |
| D325,136 S | 4/1992 | Lucht | |
| D337,466 S | 7/1993 | Moser | |
| D353,230 S | 12/1994 | Reusche et al. | |
| 5,538,145 A * | 7/1996 | Held | A47B 31/00 211/41.2 |
| D438,063 S | 2/2001 | Indekeu | |
| D450,221 S | 11/2001 | Littlejohn et al. | |
| 6,393,401 B1 * | 5/2002 | Loudermilk et al. | 704/272 |
| D521,774 S | 5/2006 | Yoshino | |

(Continued)

FOREIGN PATENT DOCUMENTS

| | | |
|---|---|---|
| JP | 2010-030617 | 2/2010 |
| KR | 20-1992-0020792 U | 12/1992 |

(Continued)

OTHER PUBLICATIONS

U.S. Notice of Allowance dated Jun. 25, 2013, for cross reference Design U.S. Appl. No. 29/419,322, (16 pages).

(Continued)

*Primary Examiner* — Richard Isla Rodas
*Assistant Examiner* — David V Henze-Gongola
(74) *Attorney, Agent, or Firm* — Lewis Roca Rothgerber Christie LLP (57) ABSTRACT

A dish having a display element installed therein includes a dish main body including a display element including a display portion and a circuit portion, a first side including a transparent material, and a second side, and a battery portion at the second side for supplying power to the display element.

11 Claims, 5 Drawing Sheets

(56) References Cited

U.S. PATENT DOCUMENTS

| | | | |
|---|---|---|---|
| D524,573 S | 7/2006 | Robinson et al. | |
| D546,075 S | 7/2007 | Kreiss | |
| D582,984 S | 12/2008 | Mininger et al. | |
| D588,823 S | 3/2009 | Butcher | |
| D607,668 S | 1/2010 | Eloy-Sanchez | |
| D621,636 S | 8/2010 | Hsu | |
| D622,084 S | 8/2010 | Stukenberg et al. | |
| D637,414 S | 5/2011 | Butcher | |
| D643,648 S | 8/2011 | Eason | |
| D651,025 S | 12/2011 | Roth et al. | |
| D654,727 S | 2/2012 | Shea | |
| D660,370 S | 5/2012 | Podd | |
| D660,651 S | 5/2012 | Peters | |
| 8,444,288 B1 * | 5/2013 | Leal | F21V 33/0036 220/574 |
| D688,883 S | 9/2013 | Gilboe et al. | |
| 2007/0251898 A1 | 11/2007 | Aarts | |
| 2008/0068356 A1 * | 3/2008 | Zavoronkovs | A47F 10/06 345/204 |
| 2010/0263793 A1 * | 10/2010 | Ylitalo et al. | 156/344 |
| 2013/0181213 A1 * | 7/2013 | Han et al. | 257/43 |

FOREIGN PATENT DOCUMENTS

| | | |
|---|---|---|
| KR | 10-2009-0047435 | 5/2009 |
| KR | 20-2011-0000381 U | 1/2011 |

OTHER PUBLICATIONS

U.S. Office action dated Feb. 26, 2014, for cross reference U.S. Design U.S. Appl. No. 29/419,124, (7 pages).

KIPO Office action dated Dec. 7, 2015, for Korean priority Patent application 20-2012-0002350, (7 pages).

* cited by examiner

DISH HAVING DISPLAY DEVICE AND APPARATUS FOR CHARGING THE SAME

CROSS-REFERENCE TO RELATED APPLICATION

This application claims priority to and the benefit of Korean Utility Model Application No. 20-2012-0002350 filed in the Korean Intellectual Property Office on Mar. 23, 2012, the entire contents of which are incorporated herein by reference.

BACKGROUND (a) Field

Embodiments of the present invention relate to a dish having a display element installed therein and a charging device of the same.

(b) Description of the Related Art

People buying a food dish or food plate may be more interested in designs of the dishes, such as prints on the surface of the dishes, than in functions such as durability and thermal conductivity. In addition, dishes might be used not only for serving the food, but may also be used for ornamental purposes.

The dishes may be designed by changing their shapes, or by printing images or patterns on the dish. However, such a design cannot be modified once it is applied to the dish.

An organic light emitting diode display includes a hole injection electrode, an electron injection electrode, and an organic emission layer formed between the hole and electron injection elements, and emits light as holes injected from an anode and, electrons injected from a cathode are recombined to cancel each other at the organic light emission layer. The OLED display device, having high quality properties such as low power consumption, high luminance, a high reaction speed, and the like, can be manufactured to be slim, and can be used in various devices including a portable electron device because of its flexible feature.

The above information disclosed in this Background section is only for enhancement of understanding of the background of embodiments of the invention, and may therefore contain information that does not form the prior art that is already known in this country to a person of ordinary skill in the art.

SUMMARY

Embodiments of the present invention provide a dish having a display element therein that is capable of changing a design in the dish by displaying various images and providing various functions.

A dish having a display element installed therein according to an exemplary embodiment of the present invention includes a dish main body including a display element including a display portion and a circuit portion, a first side including a transparent material, and a second side, and a battery portion at the second side for supplying power to the display element.

The dish main body may include a center area for accommodating food and including the display portion of the display element, and a periphery area around the center area, rising from the center area, and including the circuit portion of the display element.

The display element may include a flexible material, and an upper side of the dish main body may be concave.

The dish may further include a bottom side protection pad at a bottom side of the dish main body for sealing the battery portion.

The bottom side protection pad may include an impact cushioning member.

The dish may further include a battery terminal coupled to the battery portion and exposed through the bottom side protection pad, and a capping portion for sealing the battery terminal.

The battery portion may be configured to be charged using a wireless charging method or a solar light charging method.

The dish may further include an antenna portion using BLUETOOTH® wireless communication at an edge of the dish main body.

The dish may further include a touch screen for enabling control of the display element.

The dish may further include a detachable protection film for covering at least a portion of an upper side of the dish main body.

The dish may further include a controller coupled to the display element for controlling power to the display element and for controlling image displaying of the display element.

A charging device according to an exemplary embodiment of the present invention can charge the dish having the display element installed therein, and the charging device includes a base for supporting the charging device, a plurality of supports extended upward from the base, and a plurality of dish mounting portions, each including a supporting portion coupling adjacent ones of the supports, a stand for supporting the dish, the stand extending from and perpendicular to the support, a fixing supporting portion extending from the stand and configured to affix the dish to the dish mounting portion, and a charging terminal for charging the battery portion of the dish.

A position of the supporting portion may be adjustable with respect to the supports.

According to exemplary embodiments of the present invention, a design of the dish can be changed depending on the food served in the dish by displaying various images, and the dish can emit light so that it can be used for ornamental purposes.

In addition, according to exemplary embodiment of the present invention, the dish can perform various functions using the display element installed therein.

DETAILED DESCRIPTION

Hereinafter, a dish having a display element installed therein, and a charging device thereof, will be described in detail with reference to the drawings. Embodiments of the present invention may, however, be embodied in many different forms, and should not be construed as being limited to the embodiments set forth herein. Rather, these embodiments are provided so that this disclosure will be thorough and complete, and will fully convey the scope of the invention to those skilled in the art. In the drawings, same reference numerals will be used throughout to designate same or like components.

In addition, unless explicitly described to the contrary, the word "comprise" and variations such as "comprises" or "comprising", will be understood to imply the inclusion of stated elements but not the exclusion of other elements. It will be understood that when an element such as a layer, film, region, or plate is referred to as being "on" another element, it can be directly on the other element, or one or more intervening elements may be present.

Figure 1:
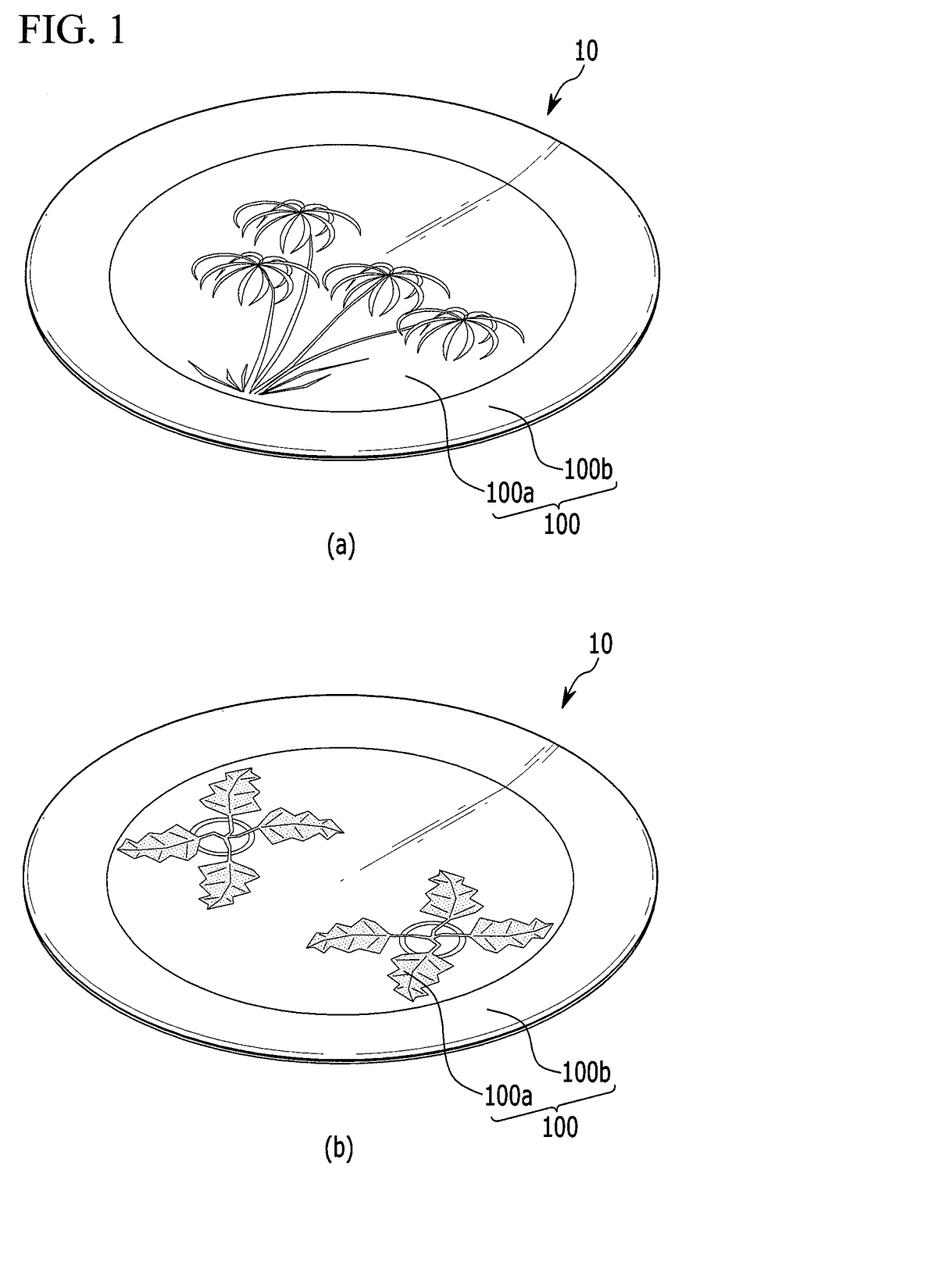
FIG. 1 is a perspective view of a dish having a display element installed therein according to an exemplary embodiment of the present invention.
Figure 2:
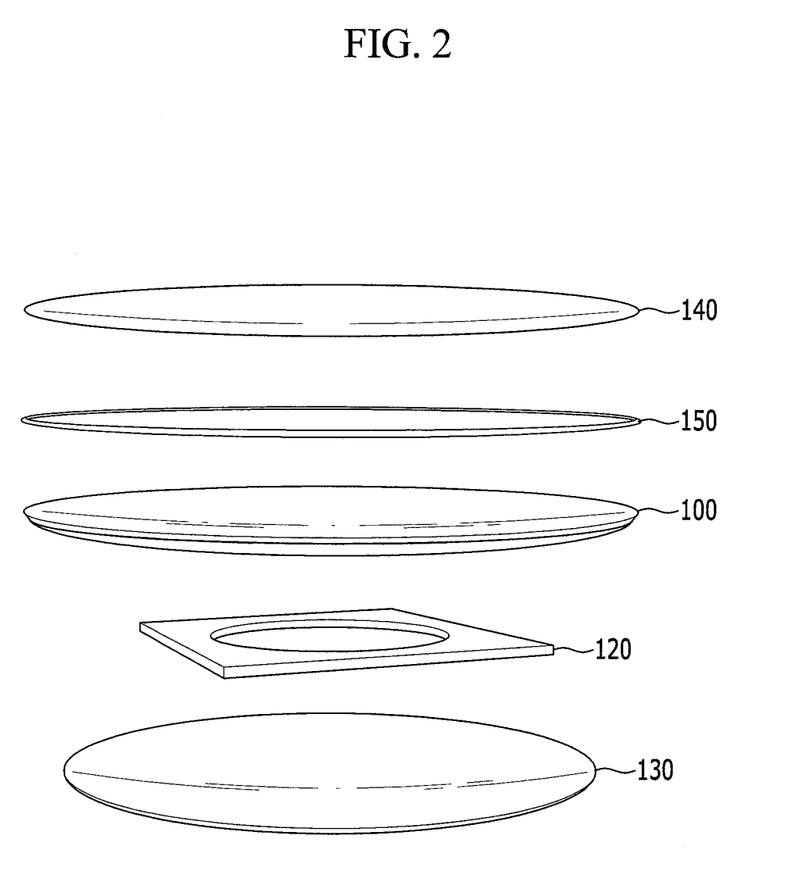
FIG. 2 is an exploded perspective view of the dish having the display element installed therein according to the exemplary embodiment of the present invention shown in FIG. 1.

FIG. 1 is a perspective view of a dish having a display element installed therein, and FIG. 2 is an exploded perspective view of the dish having the display element installed therein, according to an exemplary embodiment of the present invention.

Referring to the drawings, the present embodiment includes a dish having a display element installed therein 10, a dish main body 100, a display element 110 (FIG. 3), and a battery portion 120.

The dish main body 100 is formed in the shape of a plate so that food can be put on an upper side thereof. The dish main body 100 is in the shape of a circular plate in the present exemplary embodiment, but may be formed in other shapes, such as the shape of a polygon like a triangle or a square, or may be a curved plate having the shape of, for example, a leaf or a water droplet. In addition, the upper side of the dish main body 100 may be flat or concave downward. As shown in FIG. 2, the dish main body 100 may include a center area 100a where food may be placed, and a periphery area 100b that is higher than the center area 100a (e.g., uplifted from, or rising from, the center area 100a) while surrounding the center area 100a. Since the peripheral area 100b is higher than the center area 100a, food can be prevented from moving outside of the dish main body 100. Since the display element 110 is installed in the dish main body 100 to display an image or emit light, the upper side of the dish main body 100 may be at least partially formed of a transparent material.

The dish main body 100 may further include a protection film 140 covering the upper side of the dish main body 100, and capable of being detached from the dish main body 100. The protection film 140 can prevent, or reduce the likelihood of, an image displayed in the display element 110 from being unclear due to scratches caused by a fork or a knife, or scratches in the dish main body 100 resulting from washing. Since the protection film 140 is attachable/detachable, the protection film 140 may be attached during meal time, and the protection film 140 may be detached when the dish 10 is used for ornamental purposes. In addition, when scratches are generated in the protection film 140, the scratched protection film 140 can be replaced with another protection film 140. The protection film 140 may be a film used for surface protection, such as polyethylene terephthalate (PET) or polyethylene, although the present invention is not restricted to these materials. Various protection films formed of various components that are known to a person skilled in the art, which are not harmful to humans, can be used as the protection film.

Figure 3:
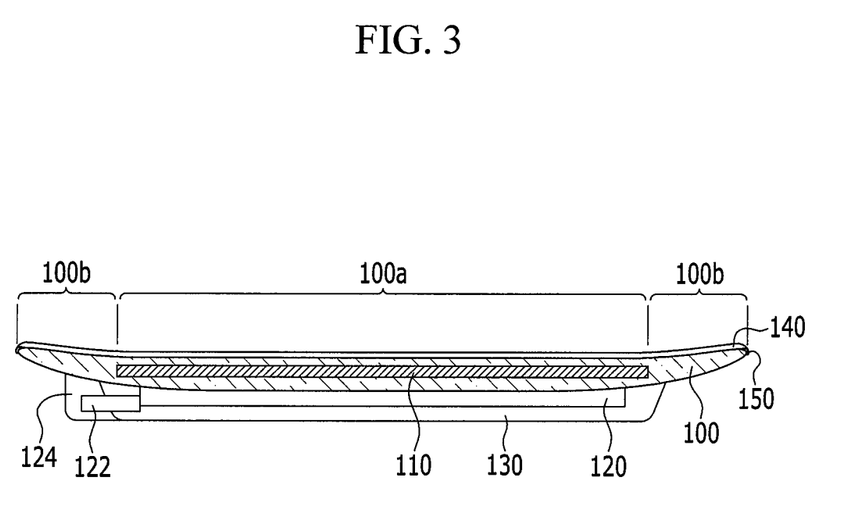
FIG. 3 is a cross-sectional side view of the dish having the display element installed therein according to the exemplary embodiment of the present invention shown in FIG. 1.

FIG. 3 is a cross-sectional side view of the dish having the display element installed therein according to the present exemplary embodiment of the present invention.

The battery portion 120 is connected with the display element 110 to supply power to the display element 110, and is disposed in a bottom side of the dish main body 110. The battery portion 120 is formed in the shape of a plate and is disposed in the bottom side of the dish main body 110, and in the present exemplary embodiment, the battery portion 120 is formed in the shape of a square plate having a hole therein, although the present invention is not restricted to the battery portion 120 of the present embodiment. The battery portion 120 can have any shape that allows it to be connected with the display element 120 and supply power to the display element 110.

The battery portion 120 may be charged by a wireless charging method or a solar charging method. When the battery portion 120 is charged by the wireless charging method, it may be charged through an antenna portion 150, and when the battery portion 120 is charged by the solar charging method, a solar light panel may be partially provided in an upper or bottom side of the dish main body 100 in a manner that will be understood by one of ordinary skill in the art.

The battery portion 120 may further include a bottom side protection pad 130 at a bottom side 120 of the dish main body 100 to seal the battery portion 120. Permeation of moisture into the battery portion 120 can be reduced or prevented by sealing the battery portion 120. The bottom side protection pad 130 is also provided as an impact cushioning member that can absorb impact, and thus not only the battery portion 120 but also the dish 10 can be protected from external impact. The impact cushioning material may be elastic rubber or urethane, but it is not limited thereto. Any material having elastic force to absorb external impact can be used.

When the bottom side protection pad 130 is provided, as shown in FIG. 3, a battery terminal (e.g., a charging terminal of the battery portion) 122 is connected to one side of the battery portion 120 and is exposed through the bottom side protection pad 130, and a capping portion 124 sealing the exposed battery terminal 122 may be further provided. The battery portion 120 may be connected with an external power source through the externally exposed battery terminal 122, and thus the battery portion 120 can be charged. In addition, the capping portion 124 seals the exposed battery terminal 122 to prevent the battery terminal 122 from being exposed to moisture and the like.

The antenna portion 150 of the present embodiment may, for example, wirelessly connect the display element 110 with an external device using BLUETOOTH® wireless communication (BLUETOOTH® is a registered trademark of Bluetooth SIG. Inc., Kirkland, Wash.). The antenna portion 150 of the present embodiment is formed along the edge of the dish main body 100. For example, when the dish main body 150 is formed in the shape of a circle, the antenna portion 150 is formed in the shape of a circular ring. The antenna portion 150 may also wireless charge the battery portion 120. When the display element 110 is connected with the external device using BLUETOOTH® wireless communication, the display element 110 may receive a signal of an image stored in the external device, and may display the corresponding image, or may be controlled by the external device.

In the present embodiment, a touch sensor formed as a touch film, a touch sheet, or a touch pad is provided in the upper side of the dish main body 100 where the display portion of the display element 110 is located to sense touch such that the display element 10 can be driven by a touch screen method.

The display element 110 may include a controller (not shown) provided at the bottom side of the dish main body 100 and connected with the display element 100, and the controller may turn on and turn off the power of the display element 110. In addition, as shown in (a) and (b) of FIG. 1, the controller may change an image displayed in the display element 110.

In the above-description, an additional coupling member is provided for coupling or access between different elements or access. In addition, an additional sealant may be further provided to reduce or prevent leakage in an accessing portion. Further, a protrusion or groove may be formed in a fitted manner for convenience in a coupling process and reduction or prevention of a leak.

Hereinafter, a charging device 20 that charges the dish of the present embodiment will be described with reference to the drawing.

Figure 4:
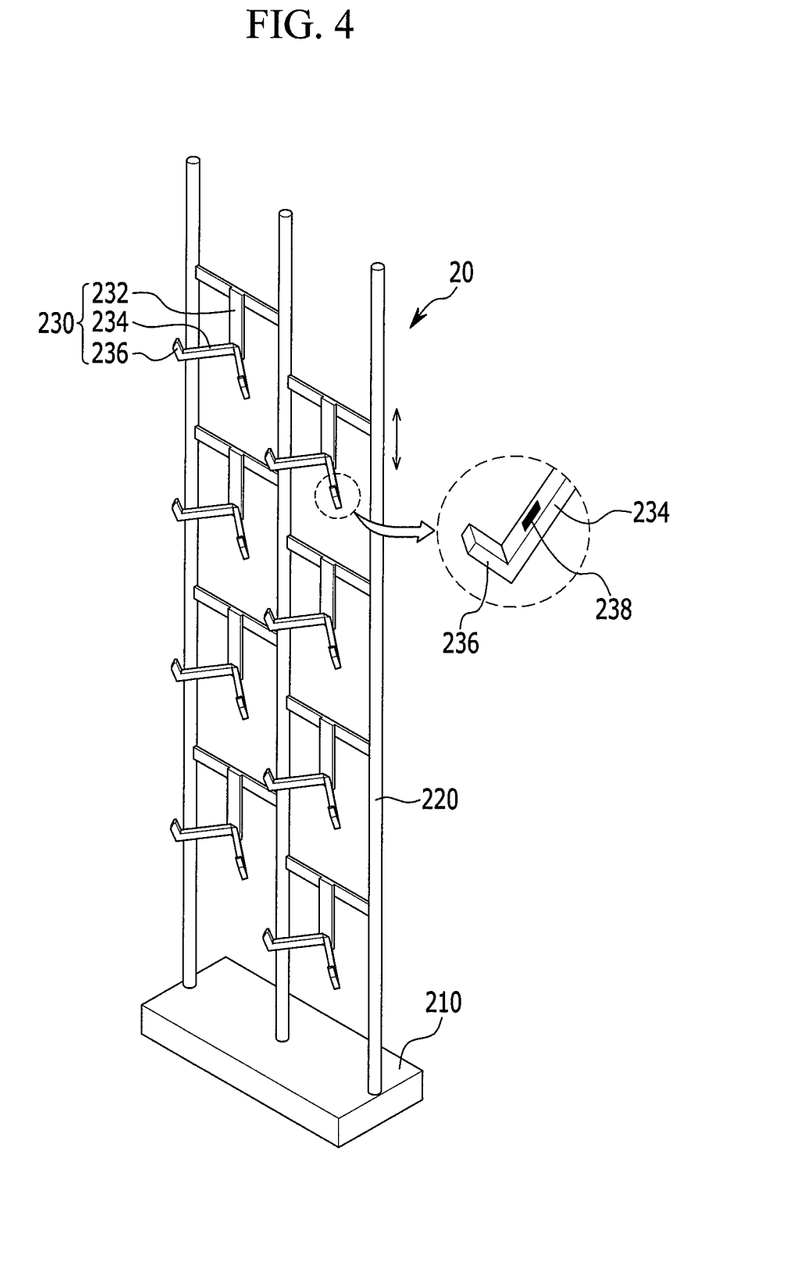
FIG. 4 is a perspective view of a charging device of the dish having the display element installed therein according to the exemplary embodiment of the present invention shown in FIG. 1.

FIG. 4 is a perspective view of the charging device 20 of the dish having the display element installed therein according to an exemplary embodiment of the present invention.

Referring to FIG. 4, the charging device 20 according to the exemplary embodiment of the present invention includes a bracket (e.g., a base) 210, a support 220, and a dish mounting portion 230.

The bracket 210 acts as a base of the charging device 20, and may be coupled to the ground, and may have a flat-plate shaped bottom side to stably support the charging device 20. A cross-section of the bracket 210 of the present exemplary embodiment may be rectangularly-shaped, although the present invention is not limited thereto. The bottom side of the bracket 210 may be realized in various shapes. In addition, an inner space of the bracket 210 may have a space (e.g., a predetermined space) to install devices and wires for charging.

Further, a plurality of supports 220 extended upward from the bracket 210 are formed at an upper side of the bracket 210. The support 220 is supported by the bracket 210, and the plurality of supports 220 may be formed in the shape of a plurality of parallel bars. In the present exemplary embodiment, three supports 220 are provided, but a different number of supports 220 (e.g., two or more) may be selected and provided according to the number of dishes 10 to be mounted and/or charged. In addition, the support 200 may have a space (e.g., a predetermined space) for installation of charging-related wires along the inner space.

The dish mounting portion 230 for mounting and charging the dish 10 having the display element installed therein includes a supporting portion 232, a stand 234, and a fixing support portion 236, and a charging terminal 238 that charges the dish 10 having the display element installed therein is formed in one side of the dish mounting portion 230. The dish mounting portion 230 is provided as a plurality of separate dish mounting portions 230 to mount a plurality of dishes 10, each having a display element installed therein.

The supporting portion 232 functions to fix, or provide additional stability to, the supports 220 by connecting adjacent supports 220. In the present exemplary embodiment, the supporting portion 232 is formed in the shape of a bar connecting bar-shaped supports 220 extended upward in a vertical direction.

The stand 234 at least partially protrudes outwardly from the supporting bar 232 to support the dish 10 having the display element installed therein. In the present exemplary embodiment, the stand 234 is extended downward in the supporting bar 232, and ends of the stand 234 are formed into two parts such that the ends may protrude to a direction crossing the up and down direction. In addition, the fixing support portion 236 is formed protruding from an end of the stand 234 and affixes the dish 10 (e.g., affixes the dish 10 to the fixing support portion 236 or to the dish mounting portion 230) such that an upper side of the dish 10 faces frontward. The inner space of the dish mounting portion 230 preferably has a predetermined space for installation of charging-related wires along the inner space.

The height of the dish mounting portion 230 may be controlled by lifting or lowering the supporting bar 232 that connects between the supports 220. As shown in FIG. 4, the dish mounting portion 230 may be alternately disposed with an adjacent dish mounting portion 230 in the horizontal direction, and may be disposed in a row direction with the dish mounting portion 230 adjacent thereto in the horizontal direction by controlling the height thereof. In addition, a gap between adjacent dish mounting portions 230 may be adjusted as the dish mounting portions 230 are moved in the up and down direction depending on the size of the dish 10 having the display element installed therein.

The dish 10 having the display element installed therein may be mounted to the dish mounting portion 230, and may be charged through the charging terminal 238 formed in one side of the dish mounting portion 230. The dish mounting portion 230 may be charged by combination of the charging terminal 238 of the dish mounting portion 230 and the battery terminal 122 of the battery portion 120 of the dish 10 having the display element installed therein.

In addition, the bracket 210, the support 220, and the dish mounting portion 230 can install configuration such as charging-related devices such as a charging adapter and wires connecting the charging-related device and the charging terminal therein, and therefore space utilization can be simplified and a good appearance can be provided.

Figure 5:
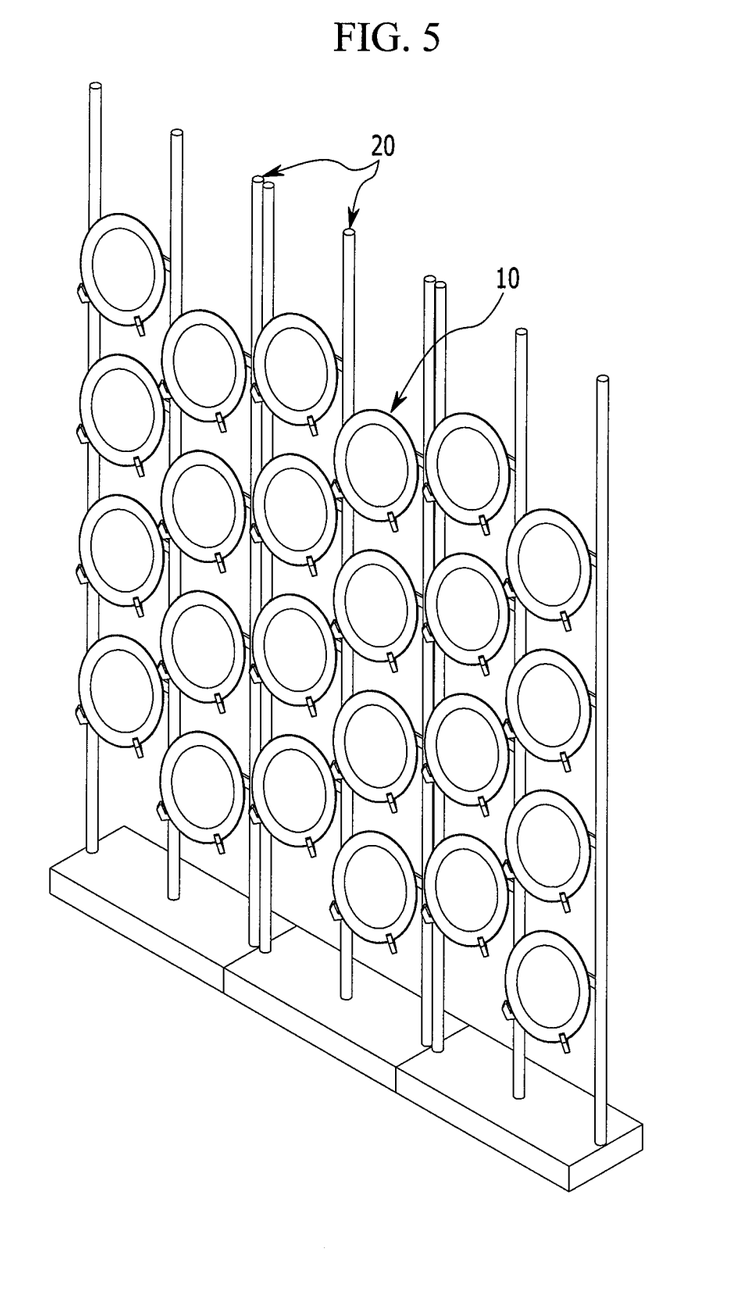
FIG. 5 is a view of the dish having the display element installed therein in the state of being charged by the charging device.

FIG. 5 is a view illustrating a state in which the dish 10 having the display element installed therein is mounted to the charging device 10 to be charged.

The dish 10 having the display element installed therein may be charged while being mounted to the dish mounting portion 230, and, as shown in FIG. 5, the upper side of the dish 10 faces frontward, the bottom side of the dish 10 is leaned on the dish mounting portion 232, and the edge of the dish 10 is fixed by the fixing support portion 236.

The dish 10 having the display element installed therein can be mounted to the charging device 20, allowing external power to be connected through contact of the charging devices 122 and 128, and the dish 10 can be used as an ornament.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims, and their equivalents.

DESCRIPTION OF SOME OF THE REFERENCE CHARACTERS

100: dish main body
110: display element
120: battery portion
130: bottom side protection portion
140: protection film
150: antenna portion

What is claimed is:
1. A dish and a charging device for charging a battery portion of the dish, the dish comprising:
   a display element comprising a display portion and a circuit portion;

a dish main body comprising a first side formed of a transparent material and a second side and further comprising a center area and a periphery area surrounding the center area, the center area for accommodating food and comprising the display portion of the display element, and the periphery area having a curvature forming an edge at where the periphery area meets the center area and comprising the circuit portion of the display element; and a battery portion at the second side for supplying power to the display element; and, the charging device comprising:
- a base for supporting the charging device;
- at least three supports extending upward from the base and being arranged along a first direction; and
- a plurality of dish mounting portions, each comprising:
    - a supporting portion coupling adjacent ones of the supports;
    - a stand for supporting a plurality of the dishes, the stand extending from and perpendicular to the supporting portion;
    - a fixing supporting portion extending from the stand and configured to affix ones of the dishes to the respective dish mounting portion such that the dishes are arranged along a same plane and ones of the dishes are adjacent to each other in the first direction; and
    - a charging terminal for charging the battery portion of the respective one of the dishes.

2. The dish and the charging device of claim 1, wherein a position of the supporting portion is adjustable with respect to the supports.

3. The dish and the charging device of claim 1, wherein the display element comprises a flexible material, and wherein an upper side of the dish main body is concave.

4. The dish and the charging device of claim 1, wherein the dish further comprises a bottom side protection pad at a bottom side of the dish main body for sealing the battery portion.

5. The dish and the charging device of claim 4, wherein the bottom side protection pad comprises an impact cushioning member.

6. The dish and the charging device of claim 4, wherein the dish further comprises:
- a battery terminal coupled to the battery portion and exposed through the bottom side protection pad; and
- a capping portion for sealing the battery terminal.

7. The dish and the charging device of claim 1, wherein the battery portion is configured to be charged using a wireless charging method or a solar light charging method.

8. The dish and the charging device of claim 1, wherein the dish further comprises an antenna portion using BLUETOOTH® wireless communication at an edge of the dish main body.

9. The dish and the charging device of claim 1, wherein the dish further comprises a touch screen for enabling control of the display element.

10. The dish and the charging device of claim 1, wherein the dish further comprises a detachable protection film for covering at least a portion of an upper side of the dish main body.

11. The dish and the charging device of claim 1, wherein the dish further comprises a controller coupled to the display element for controlling power to the display element and for controlling image displaying of the display element.

* * * * *